(12) United States Patent  (10) Patent No.: US 7,223,201 B2
Colvin et al.  (45) Date of Patent: May 29, 2007

(54) CONTROL OF POWER-ON DOWNSHIFTS IN A MULTIPLE-RATIO POWERTRAIN FOR A HYBRID VEHICLE

(75) Inventors: Dan Colvin, Farmington Hills, MI (US); Walt Ortmann, Saline, MI (US); Michael Encelewski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 10/905,324

(22) Filed: Dec. 28, 2004

(65) Prior Publication Data

US 2006/0142117 A1 Jun. 29, 2006

(51) Int. Cl.
*B60W 10/02* (2006.01)
(52) U.S. Cl. .......................... 477/5; 477/102; 903/945
(58) Field of Classification Search ................ 477/3, 477/5, 6, 107, 109, 101, 102; 903/941, 942, 903/945; 180/65.2–65.4
See application file for complete search history.

(56) References Cited

U.S. PATENT DOCUMENTS

| 5,713,425 A | * | 2/1998 | Buschhaus et al. ........ 180/65.2 |
| 5,903,113 A | | 5/1999 | Yamada et al. |
| 6,019,698 A | * | 2/2000 | Lawrie et al. .................. 477/5 |
| 6,019,699 A | | 2/2000 | Hoshiya et al. |
| 6,346,063 B1 | * | 2/2002 | Kondo et al. ................ 477/143 |
| 6,427,550 B1 | | 8/2002 | Bowen |
| 6,499,370 B2 | | 12/2002 | Bowen |
| 6,656,082 B1 | | 12/2003 | Yamada et al. |
| 6,702,709 B2 | * | 3/2004 | Bowen ........................ 475/277 |
| 2002/0088288 A1 | | 7/2002 | Bowen |
| 2002/0088290 A1 | | 7/2002 | Bowen |
| 2002/0104397 A1 | | 8/2002 | Bowen |
| 2002/0123409 A1 | * | 9/2002 | Suzuki et al. ................... 477/3 |
| 2002/0170758 A1 | | 11/2002 | Shimabukuro et al. |
| 2003/0069103 A1 | | 4/2003 | Ibamoto et al. |
| 2005/0009665 A1 | * | 1/2005 | Cho .............................. 477/5 |
| 2006/0089775 A1 | * | 4/2006 | Whitton et al. ............... 701/51 |

* cited by examiner

*Primary Examiner*—Charles A. Marmor
*Assistant Examiner*—Justin K. Holmes
(74) *Attorney, Agent, or Firm*—David B. Kelley; Brooks Kushman P.C.

(57) ABSTRACT

A method for controlling engagement and release of friction clutches in a multiple-ratio transmission for a hybrid electric vehicle powertrain uses electric motor torque to augment engine torque as a power-on downshift is commanded. Near the end of a downshift event, total powertrain torque is modulated or reduced to reduce torque disturbances.

7 Claims, 6 Drawing Sheets

| FRICTION ELEMENT APPLICATION |||||||
|---|---|---|---|---|---|---|
| GEAR | RC | FC | DC | L/R | 2/4 | RATIO |
| 1ST |  | X |  | X |  | 2.889 |
| 2ND |  | X |  |  | X | 1.571 |
| 3RD |  | X | X |  |  | 1.000 |
| 4TH |  |  | X |  | X | 0.698 |
| REV | X |  |  | X |  | 2.310 |
| X = ELEMENT TRANSMITS TORQUE |||||||

CONTROL OF POWER-ON DOWNSHIFTS IN A MULTIPLE-RATIO POWERTRAIN FOR A HYBRID VEHICLE

BACKGROUND OF THE INVENTION

1. Field of the Invention

The invention relates to a multiple-ratio power transmission mechanism in a hybrid vehicle powertrain.

2. Background Art

An example of a hybrid electric vehicle powertrain is disclosed in U.S. Pat. No. 6,585,066, which is assigned to the assignee of the present invention. The powertrain includes an electric motor, such as a high voltage induction motor, situated between an internal combustion engine and a multiple-ratio power transmission mechanism, wherein driving torque of the engine is supplemented with electric motor torque. The combined engine torque and electric motor torque is transferred to vehicle traction wheels through multiple-ratio gearing of the power transmission mechanism. A wet clutch assembly may be included in the power flow path between the torque input element of the multiple-ratio power transmission mechanism and the crankshaft of the engine. The torque output side of the clutch is connected to the rotor of the electric motor, which functions as a motor/alternator unit. The engine and the electric motor are controlled so that the engine and the electric motor function in their respective optimum efficiency operating ranges, thereby improving fuel economy and reducing undesirable exhaust gas emissions from the engine.

During operation from a standing start, the powertrain of the '066 patent receives a power request or command by the vehicle driver for power to effect controlled acceleration. The driver command is in the form of a signal that is a function of the depression of a vehicle accelerator pedal. During a power-on downshift in a powertrain with a conventional automatic transmission, the engine torque will increase because of the advancement of the accelerator pedal. That increase in engine torque is used to both accelerate the vehicle and overcome the engine's inertia as the engine speed increases to the value corresponding to a higher gear ratio.

During the speed ratio change, the transmission remains initially in the upshifted torque ratio. A torque ratio change takes place at the end of the speed ratio change. During the speed ratio change, there is no significant change in wheel torque, which causes a delay in the desired acceleration. The length of the delay depends on the amount of torque that the engine is producing and the amount of the effective inertia mass connected to the engine.

Torque fluctuations in the powertrain can occur also at the end of the downshift as friction torque establishing elements of the transmission are engaged and released synchronously. This also can result in a lack of smoothness of a downshift.

SUMMARY OF THE INVENTION

The invention comprises a method and strategy for adding motor torque input during the inertia phase of a power-on downshift to bring the transmission input speed to its synchronized value in a reduced time and for smoothing the end of the downshift by modulating engine torque input.

The pre-transmission electric motor makes it possible to achieve a power-on downshift that is of high quality due to a reduction of the time of the inertia phase and due to elimination of undesirable torque fluctuations as the friction elements in the multi-ratio transmission are engaged and released to establish and disestablish multiple torque flow paths to the vehicle traction wheels. Torque distribution to the wheels during the shift event thus is modified by the strategy and control method of the invention. Torque fluctuations are avoided by making motor torque available to overcome engine inertia forces and friction forces as the engine speed changes during the shift event.

The shift event is characterized by four operating modes. The first mode begins as soon as a downshift is commanded. At this time, fluid pressure actuators for the friction torque establishing elements in the transmission are filled and motor torque is commanded to increase. The shift itself involves application of an on-coming clutch and release of an off-going clutch in response to pressure commands. In the second operating mode, the pressure of the off-going clutch, if it is at a value that is too high for initiating clutch slip at the end of the first mode, is ramped down at a rate that is fast enough to achieve the pressure in the off-going friction element actuator that is needed to begin the downshift. In the third mode, the motor torque is maintained at the value established during the first or second modes. The electric motor torque then is decreased to its value prior to the beginning of the shift. The rate of decrease is a function of a control variable called "percent shift complete".

According to one embodiment of the invention, the input torque to the transmission is lowered by reducing or modulating engine torque during the fourth mode. This will reduce dynamic torque disturbance, due to the torque ratio change, at the torque output elements of the transmission. In another embodiment of the invention, the electric motor is used to control total input torque to the transmission by generating a negative regenerative motor torque. In this case, the electric motor enters a regenerative mode during which it acts as a voltage generator to charge the powertrain battery during the fourth mode.

Torque transfer between the friction elements during a power-on downshift occurs as pressure of the on-coming friction element is increased simultaneously with a controlled decrease of the pressure of the off-going friction element.

DETAILED DESCRIPTION OF EMBODIMENTS OF THE INVENTION

Figure 1:
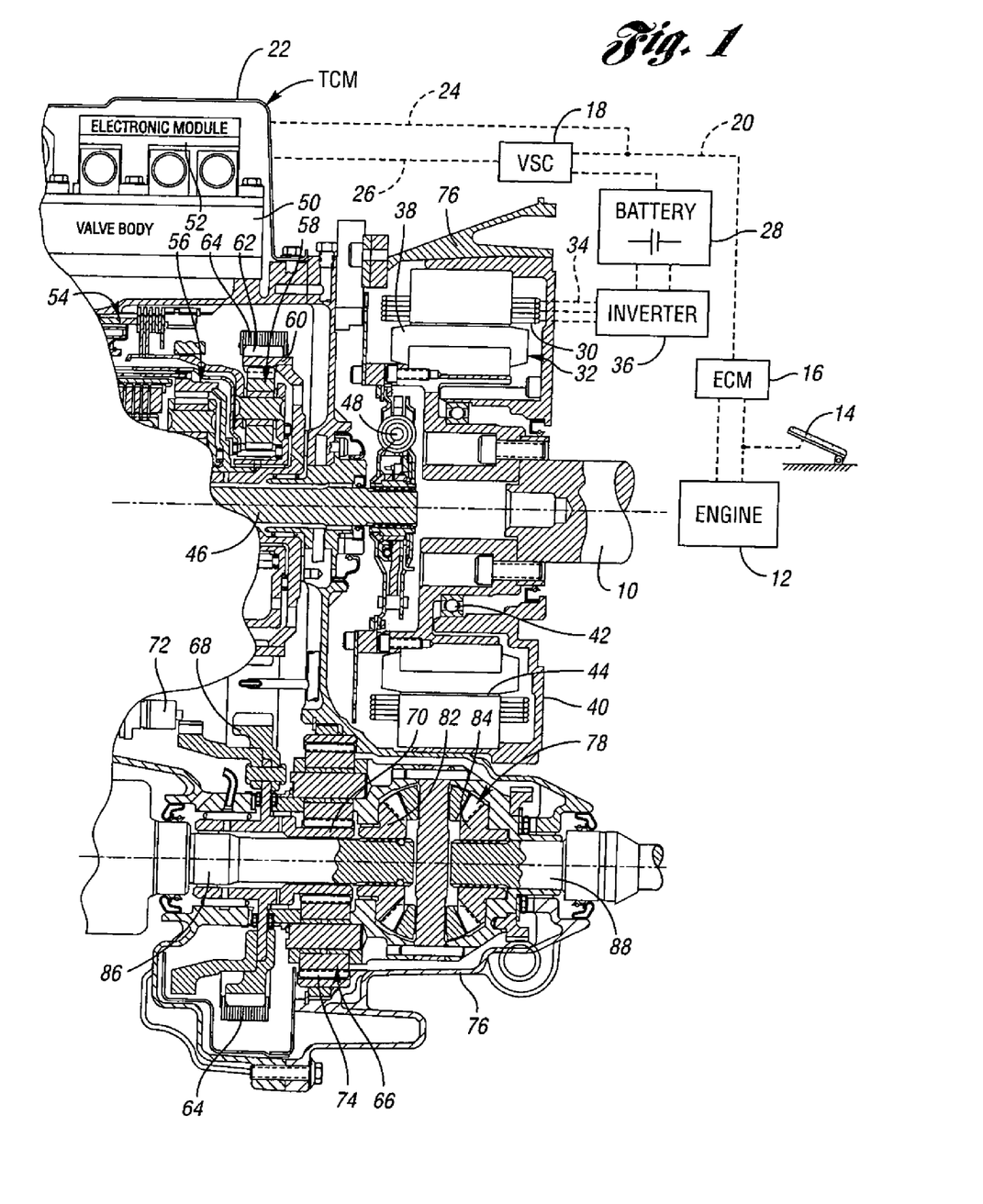
FIG. 1 is a partial cross-sectional view of a multiple-ratio power transmission mechanism for use in the powertrain of the invention.

FIG. 1 shows the overall powertrain system in schematic form. It includes a partial detailed cross-sectional view of a multiple-ratio transmission and the disposition of the motor with respect to the engine and the transmission. The torque input shaft for the motor is shown at 10. It is coupled to the crankshaft of engine 12, which is a throttle-controlled internal combustion engine, wherein the throttle is controlled by a driver operated accelerator pedal 14.

The accelerator pedal position is represented by a signal received by an engine control module 16, module 16 receives also an engine output speed signal as well as other variables. Electronic engine control module 16 is in communication with a vehicle system controller 18 through a data link 20. It communicates also with transmission control module (TCM) 22 through data link 24. The vehicle system controller and the electronic transmission control module communicate through a signal flow path 26. A high voltage battery 28 supplies power to the vehicle system controller through a DC/DC converter and to the stator 30 of induction motor 32 through a three-phase voltage circuit 34 developed by voltage inverter 36.

The motor 32 includes a rotor 38 that is connected to input shaft 10 and which is rotatably supported in a fixed transmission housing 40 by bearing 42. A calibrated air gap 44 is established between the stator and the rotor.

The rotor is mechanically connected to the transmission torque input shaft 46 through a spring damper assembly 48.

The transmission control module 22 includes a valve body 50 and an electronic controller 52. Valve elements in the valve body 50 respond to control signals from controller 52 to selectively distribute pressure to clutches and brakes in a multiple-ratio transmission generally identified by numeral 54. The transmission includes multiple-ratio gearing, comprising a first planetary gear unit 56 and a second planetary gear unit 58. The gear units, as well as the clutches and brakes that establish and disestablish torque flow paths through the transmission 54, will be described subsequently with reference to FIG. 2.

The ring gear 60 for gear unit 58 defines a sprocket 62 for drive chain 64, which extends to final drive gear unit 66. The chain 64 drives final drive gear 68, which is connected driveably to sun gear 70 of gear unit 66. A transmission output speed sensor 72 creates a speed signal (voltage pulses per unit of time), which is a measure of the rotary speed of gear 68.

Ring gear 74 of gear unit 66 is fixed to transmission housing portion 76, which forms a part of the stationery housing assembly that includes the stator housing 40.

Torque output differential mechanism 78 includes a differential pinion carrier, which supports differential pinions that engage differential side gears 82 and 84. These side gears, respectively, are driveably connected to torque output half shafts 86 and 88.

Figure 2:
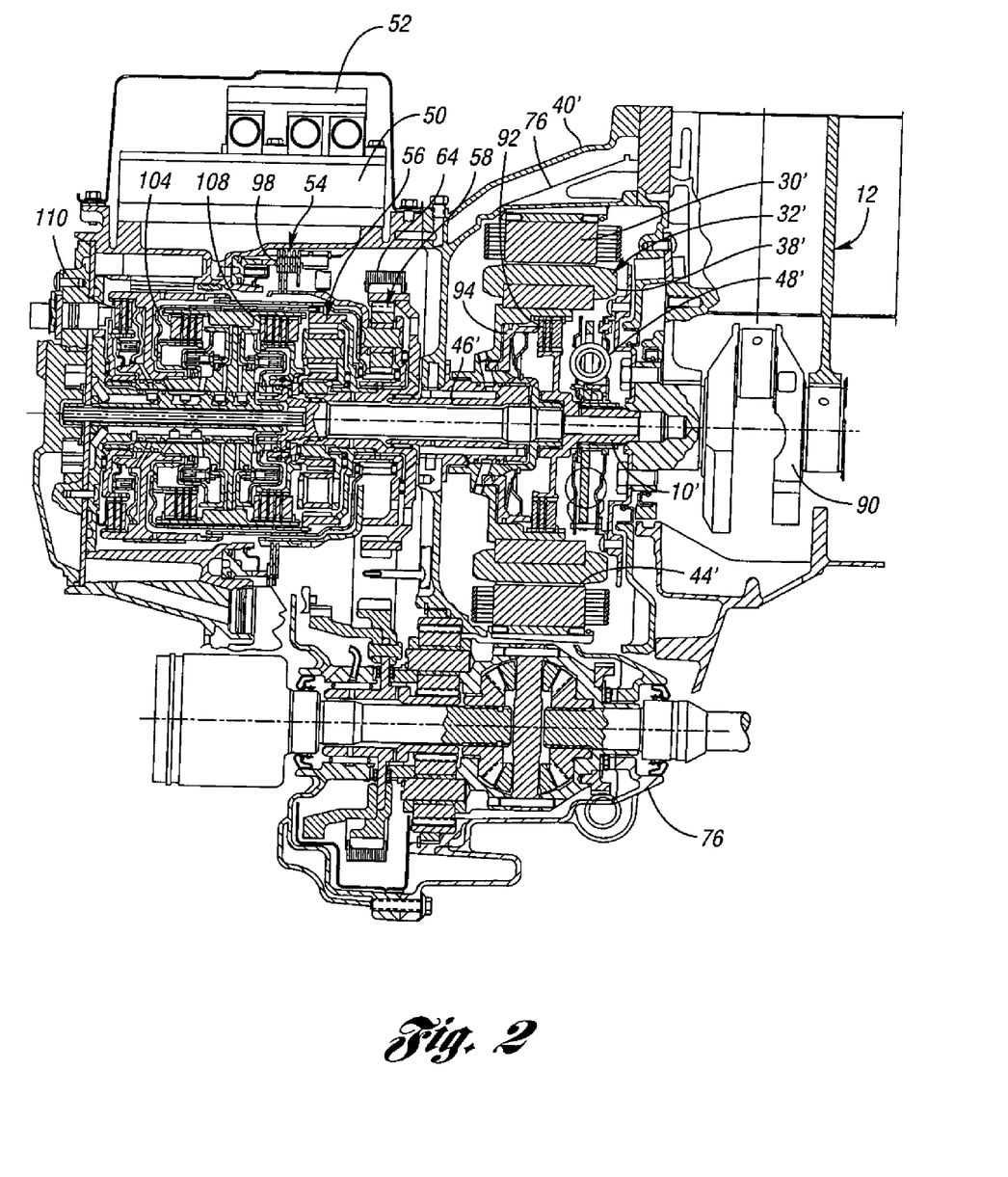
FIG. 2 is a cross-sectional view of a multiple-ratio power transmission mechanism and traction motor, together with a wet clutch, in combination with an internal combustion engine for a hybrid electric vehicle powertrain in accordance with the invention.

FIG. 2 shows a multiple-ratio transmission with a wet clutch between the torque input element 10', and motor rotor 38', which corresponds to motor rotor 38 of FIG. 1. In FIG. 2, prime notations are used with the numerals to identify structural elements that have counterparts in the assembly of FIG. 1.

The crankshaft 90 is driveably connected to damper 48'. The damper 48' includes a hub that is splined to torque input element 10'. Torque input element 10' carries a companion wet clutch friction element 92, and the rotor 38' carries a wet clutch friction element that is splined to the inner periphery of the rotor. The clutch friction elements are applied by a pressure operated friction clutch piston 94. An air gap 44' between the rotor 38' and the stator 30' corresponds to the air gap 44 of the embodiment of FIG. 1.

Figure 2A:
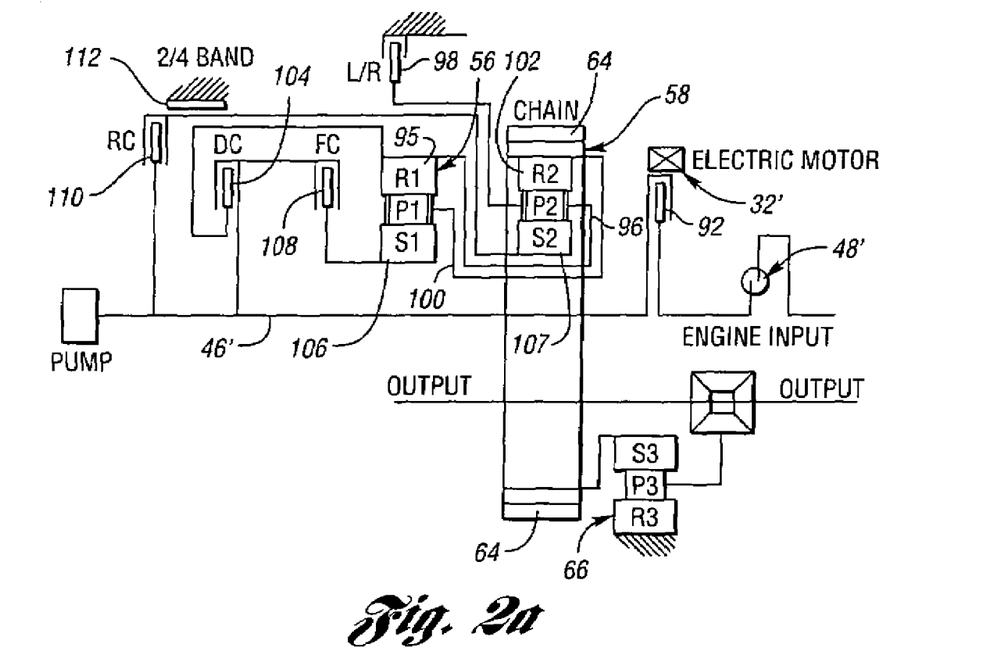
FIG. 2a is a schematic representation of the power transmission mechanism of FIG. 2.

FIG. 2a schematically shows the planetary gear elements and the friction clutches and brakes (i.e., the friction elements) that establish and disestablish the torque flow paths through the transmission.

In FIG. 2a, ring gear 95 of gear unit 56 is driveably connected to carrier 96 of gear unit 58. Carrier 96 can be braked selectively for low-ratio operation and reverse operation by friction brake 98.

Carrier 100 of gear unit 56 is connected to ring gear 102 of gear unit 58. As mentioned previously, ring gear 102 forms a sprocket for drive chain 64, which in turn drives the sun gear of planetary final drive unit 66.

Torque input shaft 46' is connected to ring gear 95 of gear unit 56 by direct clutch 104. Torque input shaft 46' is connected to sun gear 106 of gear unit 56 by forward clutch 108 during forward drive operation in the first three forward driving ratios. First ratio is established by engaging brake 98. Sun gear 107 of gear unit 58 is connected driveably to torque input shaft 46' by reverse clutch 110 during reverse drive operation. During operation in the second ratio and the over-drive fourth ratio, sun gear 107 is anchored by second and fourth ratio brake band 112.

Figure 2B:
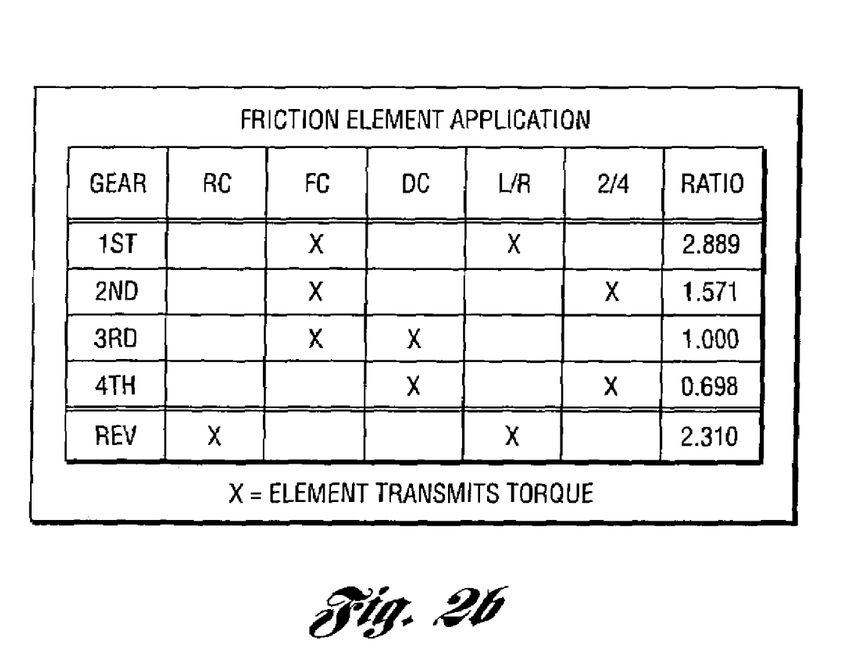
FIG. 2b is a chart showing the clutch and brake engagement and release pattern for the transmission mechanism of FIG. 2 during ratio changes.

FIG. 2b shows the clutch and brake engagement and release pattern for the friction elements illustrated in FIGS. 2 and 2a. During first gear ratio operation, the forward clutch and the low-and-reverse brake 98 are applied. The ring gear 95, therefore, acts as a reaction element during first gear ratio operation, and during reverse drive operation carrier 96 acts as a reaction element.

During second ratio operation, the forward clutch 108 and the second and fourth ratio brake band 112 are applied. The other friction elements are released. During third ratio operation, the forward clutch 108 remains applied and the direct clutch 104 is applied. The other friction elements are released. During fourth ratio operation, which is an overdrive ratio, the direct clutch 104 and the second ratio and fourth ratio brake band 112 is applied. Forward clutch 108 is released and the low-and-reverse brake 98 is released.

Reverse drive is achieved by engaging reverse clutch 110 and low-and-reverse brake 98. The other friction elements are released.

For the purpose of describing a synchronized power-on downshift for an embodiment of the invention, the downshift will be a 4/2 downshift, which requires disengagement of the direct clutch and engagement of the forward clutch as the second and fourth ratio brake band 112 remains applied. Thus the direct clutch 104 will be considered to be the off-going clutch and the forward clutch 108 will be considered to be the on-coming clutch during this 4/2 downshift.

The control strategy of the invention includes the addition of electric motor torque, a second torque source, at the input shaft of the transmission during a synchronized power-on 4/2 downshift. Unlike a conventional powertrain, which does not employ motor torque to complement engine torque, only engine torque is available to bring the input speed for the transmission to the downshifted speed. In the strategy of the invention, however, an added motor torque at the beginning of the 4/2 downshift is used. Motor torque is added during the inertia phase of the shift to bring the transmission input speed to its synchronized value sooner.

In the case of one of the embodiments of the invention, the motor torque can be used to smooth the end of the downshift, as will be explained subsequently, by reducing the torque delivered to the torque input shaft of the transmission following the inertia phase of the downshift. This will permit the motor, during this phase of the downshift, to capture regenerative energy due to regenerative torque, which can be stored in the battery. The use of the motor in this fashion results in a power-on downshift that is faster and smoother than a corresponding downshift for a conventional transmission, which does not include a motor as a second torque source.

Figure 3A:
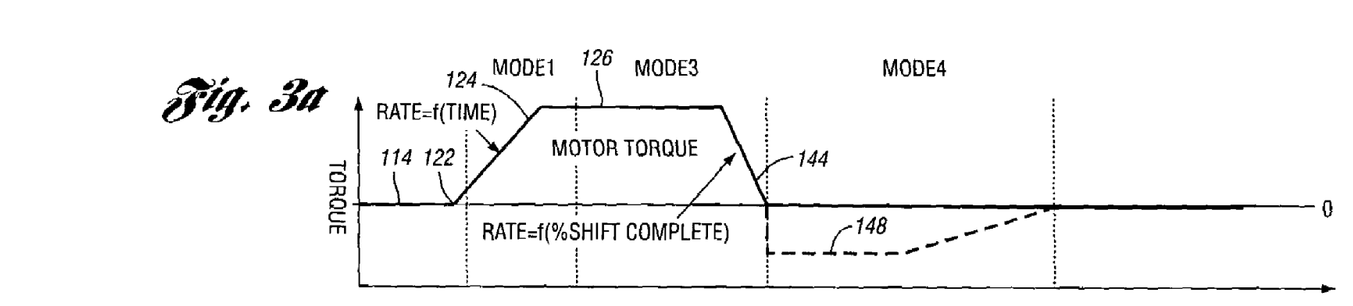
FIG. 3a is a time plot of torque modulation of the engine and torque of the motor during a synchronous, power-on downshift event.
Figure 3B:
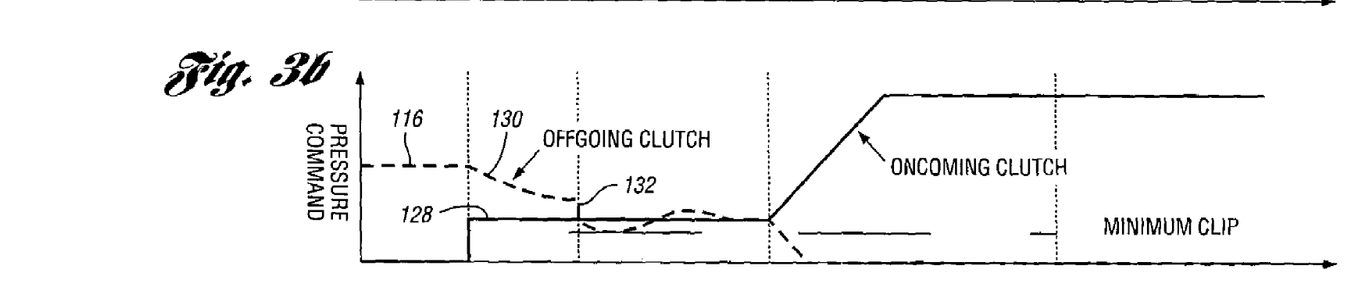
FIG. 3b is a time plot of the pressure commands for the off-going friction element and the on-coming friction element during a synchronous, power-on downshift event.
Figure 3C:
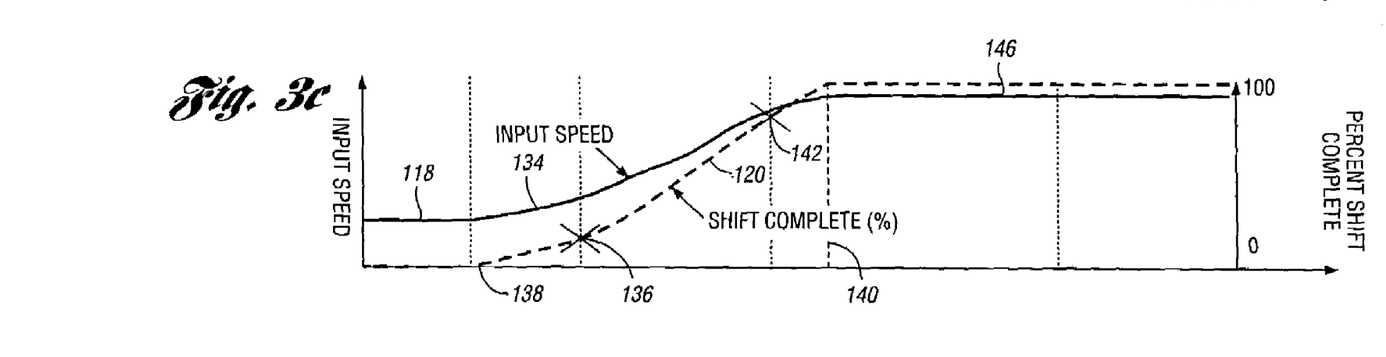
FIG. 3c is a time plot showing input speed variations for the powertrain of the invention, together with a corresponding plot for percentage shift complete.

In the time plots of FIGS. 3a, 3b, and 3c, there are three modes (modes 1, 3 and 4) for the downshift event. In FIG. 3a, the torque of the motor is plotted with a heavy line, and engine torque modulation, which effects a temporary reduction in engine torque in mode 4, is plotted with a dotted line. Prior to the downshift, during operation in fourth gear, the direct clutch is applied and the forward clutch is released, as described with reference 2b. The motor torque is at a zero value, as shown in FIG. 3a at 114. The pressure on the direct clutch, which is the off going clutch, is plotted in FIG. 3b at 116. The input speed is plotted in FIG. 3c at 118.

The plot of FIG. 3a shows variations in the commanded torque of the motor to provide an increased motor torque during modes 1 and 3 preceding the reduction in engine torque in mode 4. FIG. 3b shows the variations in pressure during the downshift event for the off-going direct clutch and the on-coming forward clutch. The change in input speed for the transmission, as the downshift proceeds from mode 1 through mode 4, is shown in FIG. 3c together with a plot indicating the percent of shift complete at 120. This variable provides trigger points for the transmission controller to effect changes from one mode to another during the shift event.

During mode 1, the fluid pressure fill phase for the on-coming forward clutch begins as soon as a downshift is requested at 122. The transmission controller at that instant increases motor torque, as shown at 124 in FIG. 3a, in accordance with a time-based ramp function. The motor torque is independent of mode and will continue to increase until it reaches a desired steady-state value, as shown at 126. At that point, the motor torque will stay constant. Simultaneously with the command for a downshift, the on-coming pressure for the forward clutch is increased, as shown at 128 in FIG. 3b. The pressure commanded at 128 normally is near the stroke pressure for the pressure operated servo used to engage the on-coming clutch. It can be modified using adaptive controls to match the particular transmission in order to overcome part-to-part variations.

The pressure for the off-going direct clutch during mode 1 is plotted at 130. The off-going direct clutch pressure is changed, as shown at 132, in response to a percentage shift complete value at 136, to an open-loop value that is a function of vehicle speed and input torque at the start of the shift. The pressure is calibrated to provide for a quick downshift that does not allow the driveline torque to become negative. This avoids torque disturbances that otherwise would be present if driveline lash were to be experienced.

The targeted off-going pressure normally is only slightly higher than the stroke pressure of the off-going clutch. The commanded off-going clutch pressure in mode 1, is heavily filtered through a simple low pass filter. In the implementation shown in FIGS. 3a, 3b and 3c, the off-going friction element capacity already is near its desired capacity before the shift. When the off going clutch is used to control tip-in and tip-out events, the clutch pressure at that instant is close to the pressure at which clutch slipping occurs. Only a small added pressure is needed to provide the added capacity to keep the clutch from slipping. The reduction in off-going direct clutch pressure shown at 130, as the input torque from the motor increases, as shown at 124 in FIG. 3a, along with an increase in engine torque, results in an increase in input speed during mode 1, as shown at 134 in FIG. 3c.

When the percent shift complete reaches the pre-calibrated value shown at 136 in FIG. 3c, the strategy will proceed to mode 3, which is the speed ratio change part of the downshift. If this trigger is not observed by the controller within a predetermined time, the strategy will move to a so-called mode 2. In mode 2, not shown in FIG. 3b, the off-going pressure for the direct clutch may be too high to begin the shift, as described in the preceding discussion. If that is the case, the off-going pressure will be ramped down at a faster rate than the rate illustrated in FIG. 3b at 130. This can occur if the off-going direct clutch starts a shift at a high value when it is not controlling a tip-in or tip-out event. The motor torque and the on-coming pressures are commanded in the same way described with reference to mode 1 in the preceding discussion.

In mode 3, the motor torque is maintained at the value that exists at the end of mode 1 (or mode 2). This mode 3 is called the ratio phase because it occurs during a ratio change. The inertia phase begins approximately at time value 138, as seen on FIG. 3c, and ends at approximately the time value illustrated at 140 in FIG. 3c.

Near the end of the speed ratio change, which is identified by the percentage shift complete value at point 142 in FIG. 3c, the motor torque is brought ramped back to its original value at 114 prior to the shifts as shown at 144 in FIG. 3a. The ram in is a function of percent shift complete. This ensures that the motor torque is synchronized with the completion of the shift.

The shift event proceeds from mode 3 to mode 4 once a calibrated value of percent shift complete is reached at 142. This begins the so-called end phase of the shift. This is where the torque ratio of the transmission changes from the upshifted value to the downshifted value. The corresponding speed values at the upshifted torque ratio and the downshifted torque ratio are shown in FIG. 3c at 118 and 146, respectively. Motor torque is reduced in mode 4 to soften the torque disturbance or the effect of the torque ratio change on the output torque as the input torque to the transmission is lowered, as shown at 148.

The change of engine torque, shown at 148 in FIG. 3a, can be referred to as "torque modulation." Torque modulation normally is done for an ignition spark-controlled internal combustion engine by retarding the spark timing. If the engine is a hydrogen fueled engine rather than a hydrocarbon fueled engine, spark control does not have enough authority. Fuel control, therefore, is used instead.

Figure 4A:
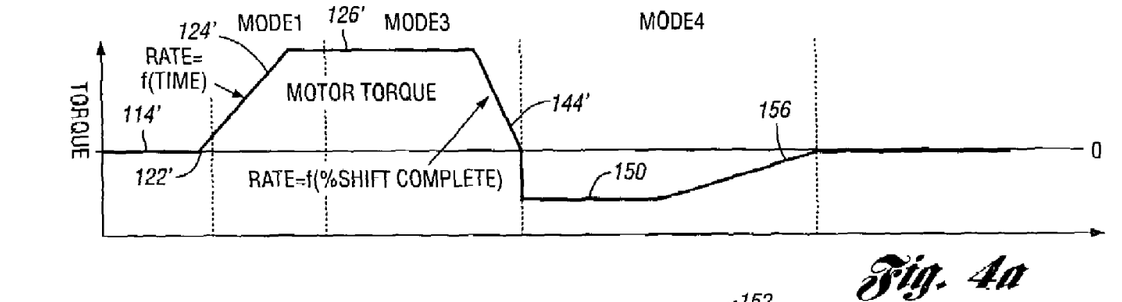
FIG. 4a is a time plot of motor torque during a synchronous, power-on downshift of the transmission of FIG. 1 or FIG. 2.
Figures 4B, 4C:
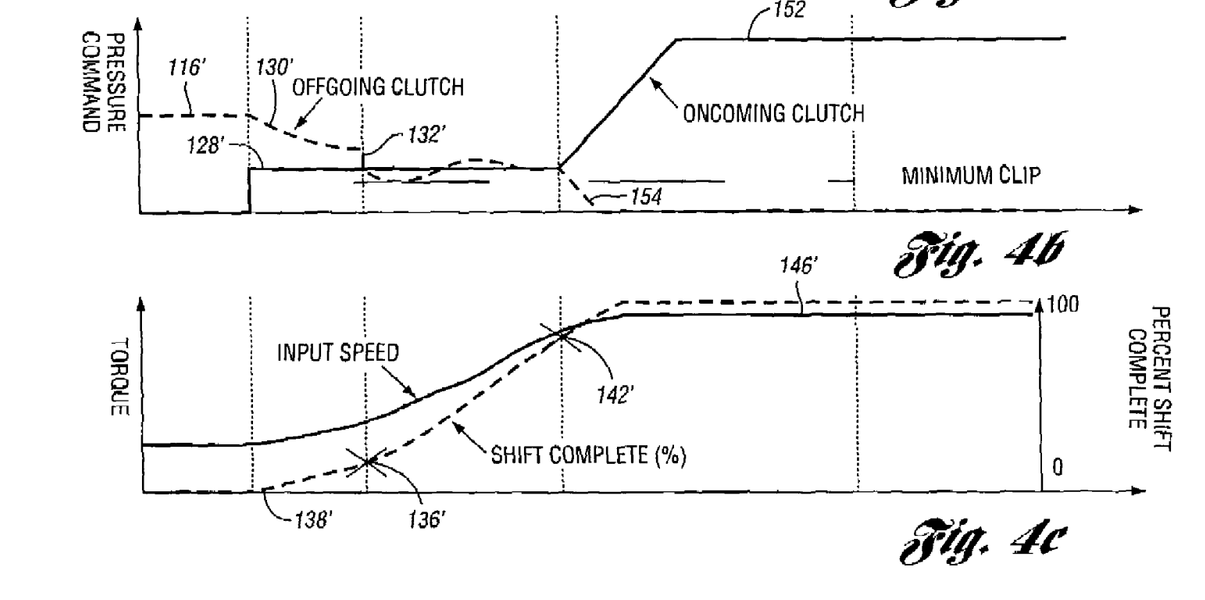
FIG. 4b is a time plot of the pressure commands for an off-going clutch and an on-coming clutch during a synchronous, power-on downshift of the transmission mechanism of FIGS. 1 and 2.
FIG. 4c is a time plot of the transmission input speed during each mode of a synchronous, power-on downshift together with the corresponding plot for shift complete.

In the embodiment of FIGS. 4a, 4b and 4c, torque reduction is achieved without the need for engine torque modulation. This is seen at 150 in FIG. 4a. Electric motor torque turns negative at the end of mode 3 and at the beginning of mode 4, as seen in FIG. 4a. The negative motor torque reduces the total input torque to the transmission during mode 4. This reduction in torque using the electric motor results in a fast response to the need for a torque reduction if the motor has enough power to meet the demands of the torque reduction requirement. An additional benefit in using a reduction in torque using the electric motor, as shown in FIG. 4a, is that a negative torque provides a slight charging of the battery as electrical energy is generated. This has a positive effect on fuel economy that is not present when torque modulation is achieved by retarding the spark of an engine.

During mode 4, the on-coming pressure is ramped to its maximum value, as shown at 152 in FIG. 4b. A corresponding ramping occurs in the case of FIG. 4b, while the off-going direct clutch pressure is ramped to a zero value, as shown at 154. The ramping of the off-going pressure and the ramping of the on-coming pressure are calibrated to provide a smooth torque transfer. If the shift is complete before the off-going direct clutch pressure reaches zero, it is immediately stepped to zero as the on-coming forward clutch pressure is stepped to its maximum value at 152. Once the shift is complete, the torque reduction is ramped back to zero, as shown at 156 in FIG. 4a. A corresponding ramping occurs, as shown in FIG. 3a, for the engine torque. The downshift is complete after the ramping of the electric motor torque or the engine torque back to the initial value is completed.

Test data for a powertrain employing the strategy described with reference to FIGS. 3a, 3b and 3c is plotted in FIGS. 5a, 5b and 5c for a synchronized 4/2 power-on downshift. In FIG. 5b, the electric motor torque is plotted at 158. The spark retard is shown at 160. This spark retard occurs in mode 4, as previously explained. Mode 4 is shown in FIG. 5b at 162.

Mode 3 is shown at 164 and mode 1 is shown at 166. Torque of the motor is commanded to increase, as shown at 124, until it reaches its steady-state maximum value at 126. This was previously described with reference to FIG. 3a.

The ramping up of the motor torque occurs during mode 1. It is ramped down, as shown at 144, during mode 3. That is followed by a spark retard of the engine, which produces the torque modulation indicated at 148 in FIG. 3a. As previously indicated, the motor torque is held at its maximum value 126 until a calibrated value for percentage shift complete is reached.

The amount of the engine torque reduction due to the spark retard at 160 is a function of the input speed at the start of the shift. It is calibrated for each shift. Also, as previously mentioned, torque modulation is achieved for a hydrogen fueled engine by controlling fuel, rather than spark retard.

Figure 5A:
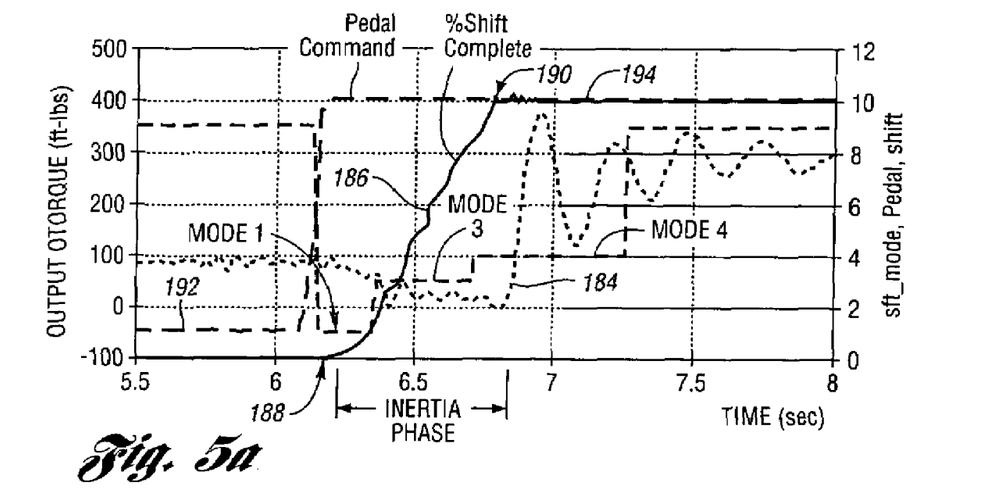
FIG. 5a is time plot of transmission output shaft torque for each of the shift modes for a synchronous, power-on downshift.
Figure 5B:
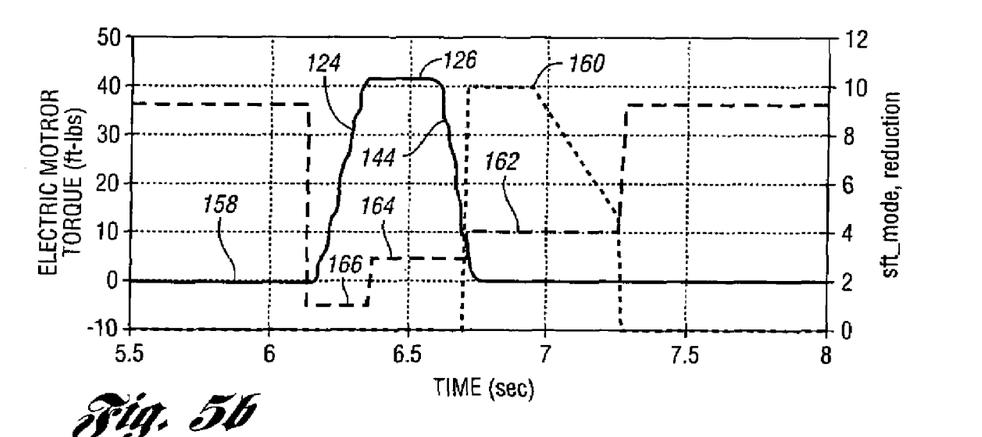
FIG. 5b is a plot of electric motor torque and the torque reduction for the engine during the fourth mode of a synchronous, power-on downshift, the engine torque reduction being accomplished by control of engine spark timing.
Figure 5C:
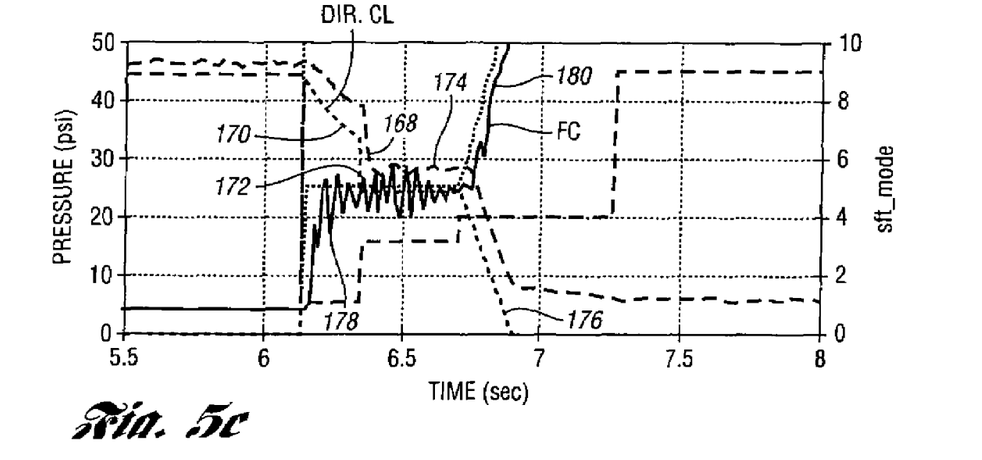
FIG. 5c is a plot of the pressures for the off-going direct clutch and the on-coming forward clutch during each mode of a synchronous, power-on downshift.

FIG. 5c shows commanded pressure and actual pressure for both the on-coming forward clutch and the off-going direct clutch. In fourth gear the direct clutch, which is the off-going clutch, is held just above its necessary torque holding capacity, as shown at 116 in FIG. 3b. This is done using a closed-loop torsional slip routine. Maintaining direct clutch torque capacity at this level enables the direct clutch to slip when the input torque attempts to rise too quickly.

At the beginning of the downshift the off-going direct clutch pressure is commanded to go to the capacity level desired during the ratio change through a filter. The filter causes the commanded pressure to change gradually, as indicated at 170 in FIG. 5c. The rise in input torque, as previously discussed, is shown at 124 in FIG. 5b. At the beginning of mode 3, the off-going direct clutch pressure command drops quickly to the desired ratio change capacity level, as shown at 172 in FIG. 5c. In mode 3, the off-going direct clutch is controlled using a conventional PID (proportional-integral-derivative) control technique, as shown at 174 in FIG. 5c. This tends to encourage a desired speed trajectory. In mode 4, the off-going direct clutch pressure is ramped down to zero, as shown at 176 in FIG. 5c.

At the beginning of the downshift the on-coming forward clutch pressure is commanded to come up to its stroke value, as shown at 178 in FIG. 5c. The forward clutch is held at this capacity during modes 1 and 3.

In mode 4, the on-coming forward clutch is ramped to its maximum capacity, as shown at 180.

In FIG. 5a, the output torque, during a downshift event, is plotted at 184. The percentage shift complete is plotted at 186. The inertia phase begins at approximately the time point shown at 188 in FIG. 5a and ends at approximately the time point 190 in FIG. 5a. Shown also in FIG. 5a is a plot showing the pedal position as the driver commands a 4/2 power-on downshift. The pedal position change begins at 192 and is advanced to a value 194 to command a downshift.

Although embodiments of the invention have been described in detail, it will be apparent to persons skilled in the art that modifications may be made without departing from the scope of the invention. All such modifications and equivalents thereof are intended to be covered by the following the claims.

What is claimed is:

1. A method for controlling a speed ratio shift for a multiple speed ratio power transmission in a hybrid electric vehicle powertrain, the powertrain having an internal combustion engine and an electric motor for developing a total vehicle driving power source, the multiple speed ratio power transmission having multiple-ratio gearing with first and second selectively engageable fluid pressure actuated friction elements for establishing and disestablishing low speed ratio and high speed ratio torque flow paths from the driving power source to a transmission torque output member, the first friction element being applied and the second friction element being released during low speed ratio operation, the second friction element being applied and the first friction element being released during high speed ratio operation, the method comprising:

increasing motor torque during an inertia phase of a speed ratio downshift as the first friction element is released;

reducing motor torque when the pressure of the second friction element is increased toward a full engagement value during the speed ratio downshift whereby inertia torque disturbances due to changing engine speed during the speed ratio downshift are reduced;

reducing actuating pressure for the first friction element during the inertia phase to a value that will effect a downshift as motor torque is increased during the inertia phase; and maintaining the reduced value of the actuating pressure for the first friction element using a closed-loop friction element pressure control.

2. A method for controlling a speed ratio shift for a multiple speed ratio power transmission in a hybrid electric vehicle powertrain, the powertrain having an internal combustion engine and an electric motor for developing a total vehicle driving power source, the multiple speed ratio power transmission having multiple-ratio gearing with first and second selectively engageable fluid pressure actuated friction elements for establishing and disestablishing low speed ratio and high speed ratio torque flow paths from the driving power source to a transmission torque output member, the first friction element being applied and the second friction element being released during low speed ratio operation. the second friction element being applied and the first friction element being released during high speed ratio operation, the method comprising:

increasing motor torque during an inertia phase of a speed ratio downshift as the first friction element is released;

reducing motor torque when the pressure of the second friction element is increased toward a full engagement value during the speed ratio downshift whereby inertia torque disturbances due to changing engine speed during the speed ratio downshift are reduced.

determining a percentage shift complete variable during the inertia phase; and initiating pressure reduction for the first friction element near the beginning of the downshift and a pressure increase for the second friction element near the end of the downshift as determined by calibrated values of the percentage shift complete variable.

3. A method for controlling a speed ratio shift for a multiple speed ratio power transmission in a hybrid electric vehicle powertrain, the powertrain having an internal combustion engine and an electric motor for developing a total vehicle driving power source, the transmission having multiple-ratio gearing with first and second selectively engageable fluid pressure actuated friction elements for establishing and disestablishing low speed ratio and high speed ratio torque flow paths from the driving power source to a transmission torque output member, the first friction element being applied and the second friction element being released during low speed ratio operation, the second friction element being applied and the first friction element being released during high speed ratio operation, the method comprising:

modulating engine torque following an inertia phase of a speed ratio downshift as the second friction element is applied; and ending the engine torque modulation following completion of the downshift when the second friction element is fully applied, whereby torque fluctuations at the transmission torque output member are reduced;

determining a percentage shift complete variable during the inertia phase; and initiating pressure reduction for the first friction element near the beginning of the downshift and a pressure increase for the second friction element near the end of the downshift as determined by calibrated values of the percentage shift complete variable.

4. A method for controlling a speed ratio shift for a multiple speed ratio power transmission in a hybrid electric vehicle powertrain, the powertrain having an internal combustion engine and an electric motor for developing a total vehicle driving power source, a multiple-ratio power transmission, the transmission having multiple-ratio gearing with first and second selectively engageable fluid pressure actuated friction elements for establishing and disestablishing low speed ratio and high speed ratio torque flow paths from the driving power source to a transmission torque output member, the first friction element being applied and the second friction element being released during low speed ratio operation, the second friction element being applied and the first friction element being released during high speed ratio operation, the method comprising:

increasing motor torque during an inertia phase of a speed ratio downshift as the first friction element is released;

modulating engine torque as the pressure of the second friction element is increased toward a full engagement value;

ending the engine torque modulation following completion of the downshift when the second friction element is fully applied, whereby torque fluctuations at the transmission torque output member are reduced; determining a percentage shift complete variable during the inertia phase; and initiating pressure reduction for the first friction element near the beginning of the downshift and a pressure increase for the second friction element near the end of the downshift as determined by calibrated values of the percentage shift complete variable.

5. A method for controlling a speed ratio shift for a multiple speed ratio power transmission in a hybrid electric vehicle powertrain, the powertrain having an internal combustion engine and an electric motor for developing a total vehicle driving power source, the transmission having multiple-ratio gearing with first and second selectively engageable fluid pressure actuated friction elements for establishing and disestablishing low speed ratio and high speed ratio torque flow paths from the driving power source to a transmission torque output member, the first friction element being applied and the second friction element being released during low speed ratio operation, the second friction element being applied and the first friction element being released during high speed ratio operation, the method comprising:

generating negative regenerative motor torque as actuating pressure for the second friction element increases to its fully engaged value and actuating pressure for the first friction element is reduced toward zero value at the end of the downshift whereby torque fluctuations at the transmission torque output member are reduced.

6. A method for controlling a speed ratio shift for a multiple speed ratio power transmission in a hybrid electric vehicle powertrain, the powertrain having an internal combustion engine and an electric motor for developing a total vehicle driving power source, the transmission having multiple-ratio gearing with first and second selectively engageable fluid pressure actuated friction elements for establishing and disestablishing low speed ratio and high speed ratio torque flow paths from the driving power source to a transmission torque output member, the first friction element being applied and the second friction element being released during low speed ratio operation, the second friction element being applied and the first friction element being released during high speed ratio operation, the method comprising:

modulating engine torque following an inertia phase of a speed ratio downshift as the second friction element is applied;

ending the engine torque modulation following completion of the downshift when the second friction element is fully applied, whereby torque fluctuations at the transmission torque output member are reduced;

the engine being a spark timing controlled internal combustion engine, the step of modulating engine torque comprising reducing spark timing at the end of the downshift; and returning spark timing to its original value when the second friction element is fully applied.

7. A method for controlling a speed ratio shift for a multiple speed ratio power transmission in a hybrid electric vehicle powertrain, the powertrain having an internal combustion engine and an electric motor for developing a total vehicle driving power source, a multiple-ratio power transmission, the transmission having multiple-ratio gearing with first and second selectively engageable fluid pressure actuated friction elements for establishing and disestablishing low speed ratio and high speed ratio torque flow paths from the driving power source to a transmission torque output member, the first friction element being applied and the second friction element being released during low speed ratio operation, the second friction element being applied and the first friction element being released during high speed ratio operation, the method comprising:

increasing motor torque during an inertia phase of a speed ratio downshift as the first friction element is released;

modulating engine torque as the pressure of the second friction element is increased toward a full engagement value;

ending the engine torque modulation following completion of the downshift when the second friction element is fully applied, whereby torque fluctuations at the transmission torque output member are reduced;

the engine being a spark timing controlled internal combustion engine, the step of modulating engine torque comprising reducing spark timing at the end of the downshift; and returning spark timing to its original value when the second friction element is fully applied.

* * * * *